(12) United States Patent
Kohn et al.

(10) Patent No.: US 7,923,144 B2
(45) Date of Patent: *Apr. 12, 2011

(54) TUNABLE FRANGIBLE BATTERY PACK SYSTEM

(75) Inventors: Scott Kohn, Menlo Park, CA (US); Gene Berdichevsky, Palo Alto, CA (US); Brian Charles Hewett, Los Alto Hills, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 1046 days.

This patent is subject to a terminal disclaimer.

(21) Appl. No.: 11/731,574

(22) Filed: Mar. 31, 2007

(65) Prior Publication Data

US 2008/0241667 A1 Oct. 2, 2008

(51) Int. Cl.
*H01M 2/06* (2006.01)

(52) U.S. Cl. ........ 429/170; 429/156; 429/159; 429/163; 429/177

(58) Field of Classification Search ........................ None
See application file for complete search history.

(56) References Cited

U.S. PATENT DOCUMENTS

| | | | |
|---|---|---|---|
| 3,773,501 A * | 11/1973 | Nakajima et al. | 148/439 |
| 5,034,290 A * | 7/1991 | Sands et al. | 429/120 |
| 5,444,378 A | 8/1995 | Rogers | |
| 5,609,972 A | 3/1997 | Kaschmitter et al. | |
| 5,667,907 A | 9/1997 | Audit et al. | |
| 5,900,332 A | 5/1999 | Marukawa et al. | |
| 6,331,763 B1 | 12/2001 | Thomas et al. | |
| 6,399,238 B1 | 6/2002 | Oweis et al. | |
| 6,773,301 B1 | 8/2004 | Chaskin | |
| 6,846,186 B2 * | 1/2005 | Lao et al. | 439/70 |
| 7,208,816 B2 | 4/2007 | Kawakami et al. | |
| 7,671,565 B2 | 3/2010 | Straubel et al. | |
| 2001/0050608 A1 | 12/2001 | Evans et al. | |
| 2002/0022159 A1 | 2/2002 | Pierson et al. | |
| 2002/0086578 A1 | 7/2002 | Ikeda | |
| 2004/0137323 A1 * | 7/2004 | Sato | 429/185 |
| 2004/0197642 A1 * | 10/2004 | Sato | 429/158 |
| 2005/0164080 A1 * | 7/2005 | Kozu et al. | 429/176 |
| 2007/0015061 A1 | 1/2007 | Klaassen | |
| 2007/0188147 A1 * | 8/2007 | Straubel et al. | 320/134 |

* cited by examiner

*Primary Examiner* — Ula C Ruddock
*Assistant Examiner* — Tony Chuo
(74) *Attorney, Agent, or Firm* — Patent Law Office of David G. Beck

(57) ABSTRACT

A tunable frangible battery pack system for use in an electric vehicle is disclosed. The tunable frangible battery pack system includes a two piece clamshell housing. The system also includes a plurality of battery cells arranged within the housing and a collector plate secured to each piece of the housing. The system also includes a wire conductor arranged between each of the battery cells and collector plates to create a frangible disconnect system when the battery pack system and electric vehicle are exposed to a predetermined mechanical or thermal force or event.

12 Claims, 2 Drawing Sheets

TUNABLE FRANGIBLE BATTERY PACK SYSTEM

BACKGROUND OF THE INVENTION

1. Field of the Invention

The subject invention generally relates to battery packs, and more particularly relates to a tunable frangible battery pack system for use in a vehicle or other industrial equipment.

2. Description of Related Art

Battery packs have been used for numerous years in electric vehicles, such as automobiles, boats, aerospace vehicles, and within other industrial equipment applications. Many of the electrical systems used in these prior art vehicles and equipment are designed to minimize the possibility of short circuiting and to reduce the potential of voltage exposure to emergency responders and other people in the general public. Such precautions help to reduce the possibility of an electrocution or other injury due to high voltage encounters and situations. There have been many different attempts at providing an electric system that will disconnect electrical circuits due to a crash of a vehicle or high temperature situations in a vehicle or industrial equipment application. Many of these prior art systems will disconnect the battery from the circuits thus creating an open circuit and protecting any responders and other people from dangerous high voltage situations. Generally, these prior art disconnect systems for battery packs will disconnect when a predetermined force is applied to the vehicle or equipment or if a predetermined thermal event occurs within the circuitry of the battery and/or electrical system.

One of the prior art methodologies for disconnecting battery cells uses a conductor wire that is either welded or bonded to a battery cell and is capable of being broken when a mechanical force is applied thereto. However, one problem with these prior art systems is that the mechanical strength of the breakable conductors was excessive and did not allow for the conductor to break unless the most extreme forces or situations acted on the vehicle or industrial equipment. Therefore, the disconnecting of the power supply system from the electrical vehicle or equipment did not occur during all emergency situations as many designs originally called for. Furthermore, the prior art methodologies of wire bonding the conductors to the cells did not provide a consistent fusing current mechanism such that high thermal events would not break the conductor, thus leaving the equipment connected to circuits which may lead to electrocution and other injuries to users or responders to an accident scene. Other types of connecting wire conductors between battery cells and other equipment have been used, including various bonding techniques for smaller diameter wires, conductive epoxies for connection between a battery cell and a bus bar or collector plate, soldering techniques that include solders made of nickel, tin, copper, plated metals, low metal alloys, etc. Furthermore, other prior art methodologies have tried installation displacement connectors to connect the battery cell to a bus bar or collector plate, mechanical crimping or pressure crimping has also been used to connect battery cells to a bus bar. Furthermore, it should be noted that conductor materials used for prior art wire conductors include copper, gold, nickel, solder, indium, tin, aluminum, low melt alloys and the like.

However, there have been problems with the prior art disconnect systems and methodologies for an electrical system having a battery pack or like power source. Some of the problems of the prior art include having the conductors arranged between battery cells and a bus bar or the like connected via bonding techniques that give the conductors very high mechanical strengths that do not allow the conductor to break unless the most extreme situations occur such as very high forces or extremely high heat. Furthermore, many of these prior art methodologies for creating a disconnect system use high cost materials and high cost processes to create such systems thus increasing the manufacturing costs and overall price structure for the manufacturer.

Therefore, there is a need in the art for an improved frangible battery pack system for use in an electric vehicle or industrial equipment. Furthermore, there is a need in the art for a tunable frangible battery pack conductor that is capable of being made in various widths and connected via an ultrasonic wedge bonding process to allow for breaking and disconnecting of the battery pack from the electrical vehicle or industrial equipment at a predetermined force or predetermined thermal parameters. There also is a need in the art for a low cost and easy to manufacture methodology and apparatus for creating a tunable frangible battery pack system including aluminum conductor wires.

SUMMARY OF THE INVENTION

One object of the present invention may be to provide an improved frangible battery pack system.

Another object of the present invention may be to provide a tunable frangible battery pack system for use in a vehicle or industrial equipment.

Still another object of the present invention may be to provide a tunable frangible battery pack conductor wire made of aluminum with predetermined amounts of magnesium and nickel added thereto.

Still another object of the present invention may be to provide a frangible battery pack conductor shaped in the form of a round wire or in the form of a ribbon.

Still another object of the present invention may be to provide a frangible battery pack conductor that is a low cost element that has high thermal conductivity and low electrical resistivity.

Still another object of the present invention may be to provide a frangible battery pack conductor that has a small cross section but is strong enough to support itself under normal operation conditions while not adding significant strength to the battery pack system.

Still another object of the present invention may be to provide a frangible battery pack conductor that has a tunable diameter, length and wire path that is capable of being designed to fatigue and fracture at predetermined vibration levels and thermal levels which may exceed acceptable battery pack limits.

To achieve the foregoing objects a frangible battery pack system for use in an electric vehicle or with industrial equipment is disclosed. The frangible battery pack system includes a housing and a plurality of battery cells arranged within the housing. The frangible battery pack system also includes a collector plate arranged on each end of the housing and a conductor arranged between the collector plate and the battery cell.

One advantage of the present invention may be that it provides a novel and improved frangible battery pack system for use in an electric vehicle or on other industrial equipment.

Still a further advantage of the present invention may be that it allows for the use of a tunable frangible battery pack system having a conductor arranged between a collector plate and a battery cell.

Still another advantage of the present invention may be that it provides a way of creating a tunable frangible battery pack system wherein a conductor is capable of being designed with different diameters, lengths, and paths between the battery cells and a collector plate such that a predetermined fatigue and fracture will occur at predetermined force or thermal levels that exceed the acceptable battery pack limits in the vehicle or equipment environment.

Still another advantage of the present invention is that it may minimize the possibility of short circuiting in the electrical system of a vehicle thus reducing the potential voltage exposure for emergency responders or the like during accidents of electrical vehicles or industrial equipment.

Still another advantage of the present invention is that the conductor for the battery pack system may be mechanically or electrically tuned to fail before a circuit reaches a predetermined threshold.

Still another advantage of the present invention is that the battery pack can be applied to various technologies such as aerospace, aviation, marine sectors, automotive sectors and industrial equipment.

Still a further advantage of the present invention may be the use of frangible conductors made from aluminum that are ultrasonically bonded to the battery cells and a collector plate.

Still another advantage of the present invention may be the use of frangible conductors that are designed to provide current carrying capability and mechanical strength during normal operation but are capable of breaking thus disconnecting the power source from the electrical circuit and the power source from responders to vehicle crashes or industrial equipment accidents.

Other objects, features and advantages of the present invention will become apparent from the subsequent description and the appended claims, taken in conjunction with the accompanying drawings.

DESCRIPTION OF THE EMBODIMENT(S)

Figure 1:
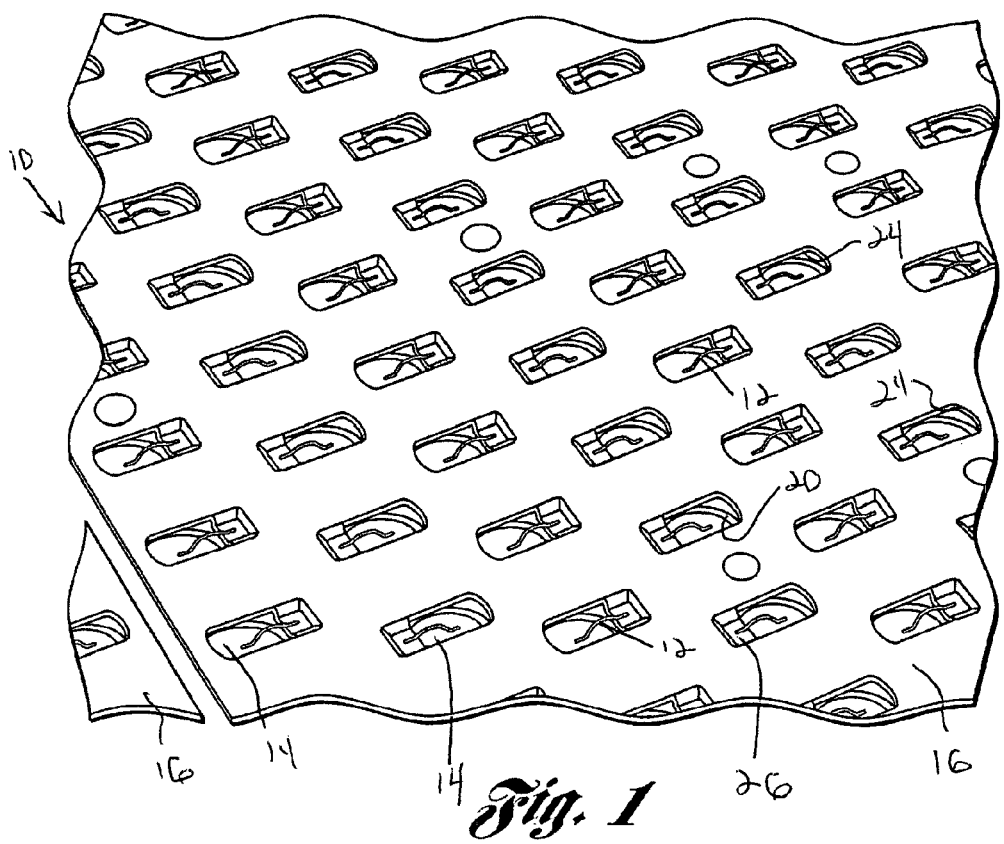
FIG. 1 shows a top view of a battery pack system according to the present invention.

Referring to the drawings, a battery pack system 10 for use in an electric vehicle or in other industrial equipment is shown. It should be noted that the battery pack system 10 shown in the drawings is for use in an electric vehicle, however the battery pack system and battery cells may be used in any combination and in any design known for use in any number of industries including but not limited to any type of vehicle and any technology dealing with aerospace, marine, aviation, industrial equipment, and any other electrical system that has a need for protecting emergency responders or everyday users from electrocution and other injuries due to high voltage applications.

The battery pack system 10 has a tunable frangible conductor/wire 12 arranged between a plurality of battery cells 14 and a collector plate 16. The use of the frangible battery pack conductor 12 will minimize the possibility of short circuiting and reduce potential exposure to high voltages by emergency responders or others in contact with the electric vehicles and industrial equipment. The battery pack system 10 of the present invention may include connections involving the battery cells 14 that will break at a predetermined impact and a predetermined thermal event. In one embodiment of the present invention the collector plate 16 will be connected to a plurality of battery cells 14 by the use of a narrow and thin conductor 12 such as a wire bond connection. It should be noted that the present invention may be designed such that the frangible conductor 12 is used within the battery pack system 10 to disconnect all of the battery cells 14 from some or all portions of the electrical circuits of the electric vehicle or to disconnect predetermined portions of the circuits from the battery cells 14. Furthermore, the wire conductor 12 may be mechanically and electrically tuned to predetermined specifications to fail before the circuit reaches a predetermined threshold of extremely high heat or extreme forces applied thereto such that the battery pack system 10 may be accessible to emergency responders or other users of the electric vehicle without the threat of electrocution or injury. It should be noted that the system 10 generally is designed for use in an electric vehicle having a high voltage electric system. It should be noted that any of these vehicles may be any of the known auto vehicles such as passenger's vehicles, military vehicles, delivery vehicles and the like. Furthermore, the same technology has also been designed for use on aerospace, aviation, and marine sector vehicles and also industrial equipment that have any type of electric system and power supply. This technology may also be used in any other technologies such as but not limited to mining equipment, cranes, presses or the like. Therefore, the present invention of a frangible battery pack system 10 can be used with any known electric vehicle or electrical system industrial, personal or otherwise.

Figure 2:
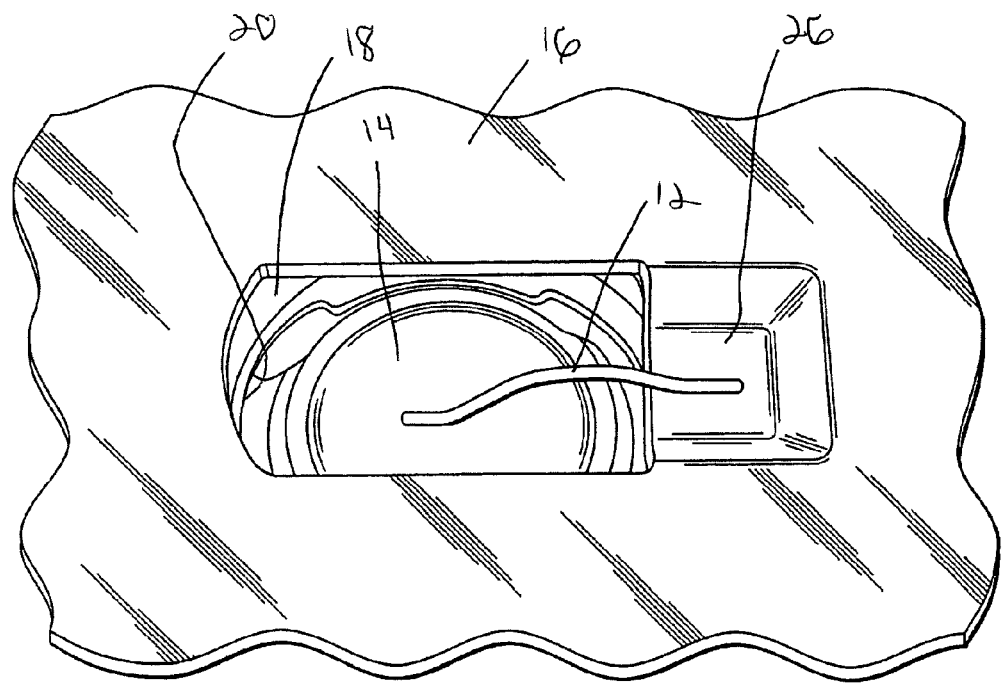
FIG. 2 shows a top view of one battery cell connected to a collector plate via a conductor according to the present invention.
Figure 3:
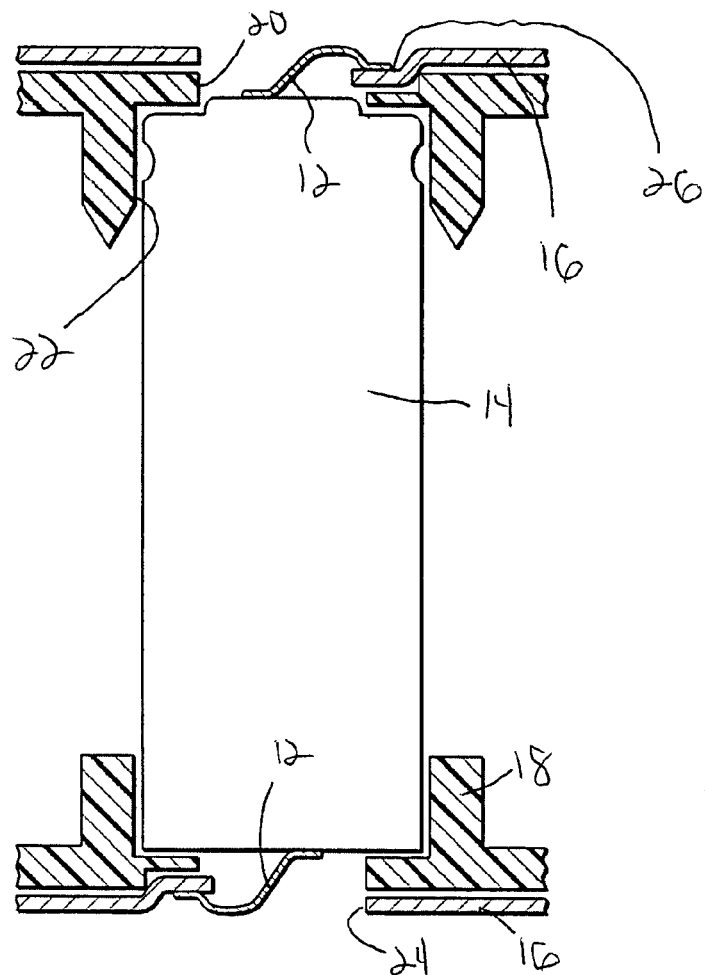
FIG. 3 shows a partial cross sectional view of a battery pack system according to the present invention.
Figure 4:
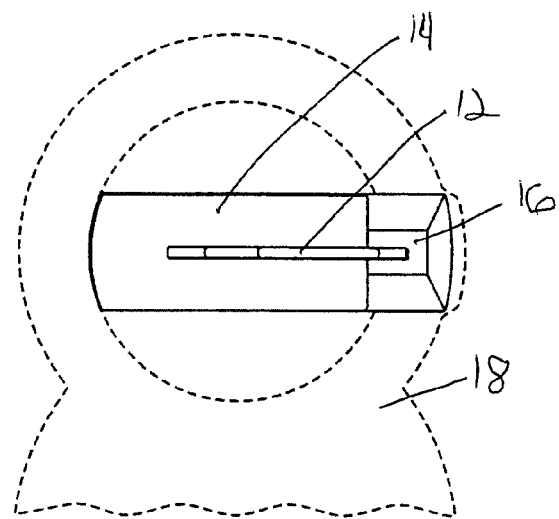
FIG. 4 shows a top view of a battery cell according to the present invention.

FIGS. 1 through 4 show a tunable frangible battery pack system 10 according to the present invention. The battery pack system 10 includes a housing 18. The housing 18 is generally a two piece clamshell housing that has a plurality of orifices 20 therethrough. The orifices 20 are generally circular in shape, however any other shaped orifice may be used. The housing 18 has a plurality of counter bores 22 arranged on each piece thereof. Each of the counter bores 22 will be used to hold and arrange therein a battery cell 14. The orifices 20 are arranged at or near a center point of the counter bore 22 of the housing 18. It should also be noted that it is contemplated to have a cooling tube arranged through the housing 18 to allow for cooling of the batteries 14 if need be. It should be noted that in one contemplated embodiment the housing 18 is made of a plastic material that is injected molded into the predetermined shape for the housing 18. However, it should be noted that any other type of material including metal, ceramic, composite, or natural material may be used for the housing 18 depending on the design requirements and environment in which the battery pack system 10 will be used.

Arranged within each counter bore 22 of the housing 18 is a battery cell 14. The battery cells 14 generally have a cylindrical shape in the embodiment shown. However, any other shape battery cell 14 may be used depending on the design requirements. The battery cells 14 are arranged within the counter bore 22 such that both ends of the battery cells 14 are exposed via the orifices 20 located at each end of the counter bores 22 through the housing 18. The end of the battery cells 14 will be used for electrical connection between the battery cells 14 and the collector plate 16.

The battery pack system 10 also includes a first collector plate 16 arranged on one end of the housing 18 and a second collector plate 16 arranged on another end of the housing 18. In one contemplated embodiment a single collector plate 16 will be used to cover one side of the housing 18. However, it is also contemplated to use multiple differently shaped and sized collector plates 16 on one side of the housing 18 and/or multiple collector plates 16 of different size and shapes on the opposite side of the housing 18. The collector plate 16 may have the same shape as that of the housing 18 and the shape may be of any known shape or diameter such as rectangular, triangular, square, circular, or any other known shape. Generally, the collector plate 16 is made of a metal material. However, it should be noted that the collector plate 16 can be made of any known material such as composite, any known metal, ceramic, natural material, plastic or any other material capable of conducting electricity. In one embodiment contemplated an electroless or electrolytic nickel plated aluminum or copper sheet metal will be used for the collector plates 16. The collector plates 16 will have a plurality of orifices 24 therethrough that will align with and mate with the orifices 20 through the housing 18 into the counter bores 22 of the housing 18. It should be noted that in one contemplated embodiment the orifices 24 are generally rectangular in shape, however any other shaped orifice 24 such as square, circular, triangular, pentagonal or the like may be used depending on the design requirements and environment in which the battery pack system 10 will be used. The collector plate 16 is secured to the housing 18 via any known connecting methodology. In one contemplated embodiment a combination of heat staking and epoxy will be used to connect the collector plate 16 to the housing 18. It should be noted that the orientation of the battery cells 14 within the housing 18, i.e., positive side up or positive side down and the size and shape of the collector plates 16 will allow for different designs and will create a unique and efficient method for creating a combination of parallel and series connections for the battery cells 14 within the electrical system of the electric vehicle. This will allow for many different designs and parameters to be achieved because of the variety of orientation of battery cells 14 within the housing 18 and the size and shape of the collector plates 16 that may be used to create both parallel and series connections within the electrical system. Furthermore, the battery cells 14 may be mounted in any other known type of matrix as long as the matrix is clad by a bus bar, collector plate or conductive plate 16.

Arranged between the battery cells 14 and the collector plates 16 are a plurality of frangible conductors 12 that create the electrical connection therethrough. Generally, the frangible conductor 12 is in the shape of a wire, however it is also contemplated to be in any other shape, such as a ribbon or the like. The conductor 12 generally is bonded to an end surface of the battery cell 14 and to the collector plate 16 at a predetermined position. In the embodiment shown the collector plate 16 may include a recessed portion 26 adjacent to the orifice 24 of the collector plate 16 that exposes the end of the battery cell 14. The recessed area 26 may be of any predetermined size and shape. In the embodiment shown the recessed area 26 is adjacent to each and every orifice 24 through the collector plate 16.

The frangible conductor 12 may also have any type of cross section other than a round or circular such as square, rectangular, triangular, or any other known cross sectional shape. In one embodiment contemplated the conductor 12 is generally made of an aluminum alloy material. Some aluminum alloy materials that may be used include but are not limited to 99.999% aluminum, 99.99% aluminum, 99% aluminum and 1% silicone, or 99.5% aluminum. It should be noted that any other type of metal, ceramic or composite may also be used for the frangible conductor 12 according to the present invention. The frangible conductor 12 of the present invention may also include 0.5% by weight magnesium and 50 parts per million nickel along with the aluminums as described above. The use of the magnesium will add strength to the wire 12 which may help bond through any surface oxide that may be present on the battery cell 14 and collector plate 16. Furthermore, the nickel may provide a corrosion resistance effect to the frangible conductor 12 for the present invention. It should be noted that any other known substance may also be added to the conductor 12 along with or in place of one or both of the magnesium or nickel material. It should be noted that the frangible conductor 12 of the present invention generally is in the shape of a round wire that may drawn into any known diameter, however in the embodiment shown the diameter may be anywhere between 0.011 inches to 0.016 inches. In particular one diameter may be 0.012 inches or 0.015 inches. Furthermore, it is also contemplated that the frangible conductor 12 may be used in a ribbon form wherein the cross section of the ribbon may be within the range of 0.02 inches by 0.001 inches to 0.1 inches by 0.01 inches. In one contemplated embodiment a ribbon would have the form of 0.03 inches by 0.003 inches or 0.08 inches by 0.008 inches.

The frangible conductor 12 is connected to the end of the battery cell 14 and the collector plate 16 via any known connecting methodology both mechanical and chemical. The conductor 12 is bonded to the battery cell 14 and to the collector plate 16 in one contemplated embodiment via an ultrasonic wedge bonding process. However, it should be noted that any other ultrasonic bonding process along with any other type of welding process, mechanical crimping process, conductive epoxy process, soldering process, installation displacement connectors, or any other known bonding process may be used to connect the frangible conductor 12 to both the collector plate 16 and the battery cell 14. In the contemplated ultrasonic wedge bonding process a bonding machine will feed out the conductor 12 either in the form of wire, ribbon or any other shape at a predetermined pace and will have it bonded to both the battery cell substrate and the collector plate substrate and cut the conductor 12 at an appropriate length. The ultrasonic wedge bonding process uses a computer controlled mechanism that can be programmed to place the wires 12 automatically and then use optical recognition or other methodology to validate and adjust the positions of the conductor 12 with relation to the battery cells 14 and the collector plate 16.

It should be noted that aluminum has been chosen as the preferred material for the conductor wire 12 because it is easily tunable to be a frangible conductor 12 for the following reasons. It may be bonded using the ultrasonic process, it is a low cost element and it has high thermal conductivity and low electrical resistivity, which will increase the durability and tunability of the battery pack system 10 in the electric vehicle. It should be noted that high thermal conductivity will allow a small cross section wire 12 to carry a current sufficient enough to operate in the high voltage applications. The small cross section furthermore is strong enough to support itself under normal operating conditions of the vehicle and battery pack system 10 but will not add significant strength to the battery pack system 10. This will ensure that the battery pack battery cells 14 will disconnect from the collector plate 16 when a predetermined mechanical force or thermal situation is applied to the battery pack system 10. It should be noted that the diameter, length and path of which the frangible conductor 12 is laid and arranged between the battery cell 14 and collector plate 16 can all be varied to allow for a predetermined fatigue and fracture to occur at predetermined vibration levels, mechanical force levels and thermal levels which exceed any predetermined battery pack system 10 limitations throughout the entire electrical vehicle operating system.

It should be noted that it is contemplated to provide an added level of mechanical support within the battery pack system 10, an added level of corrosion resistance, and arc suppression by use a silicone dielectric gel to fill the counter bore 22 around the battery cells 14 and cover the frangible conductor wire bond and wire 12. It should be noted that any other type of gel or other gel like substance may be used to provide the extra mechanical support, corrosion resistance and arc suppression as that of a silicone dielectric gel.

In operation, the battery pack system 10 will operate within the electric vehicle or industrial equipment to prevent electrocution and other injuries to first responders or users of such vehicle and equipment. In particular, in the event of an electric vehicle collision, crash or excessive shock, there is a chance that components within the electrical vehicle and specifically the battery cells 14 within the battery pack system 14 could break in a manner which is hazardous to the occupants of the vehicle, emergency responders, first responders, and any other people involved. In order to combat this potential injury situation the frangible conductor 12 is arranged between the battery cells 14 and collector plates 16 and is designed to break or disconnect the collector plate 16 from the battery cells 14 when a predetermined mechanical force is applied to the vehicle in the form of a shock, jolt or other excessive mechanical episode. It should be noted that the two primary hazards within the electric vehicle for which the frangible battery pack system 10 is best used are high voltages and thermal runaway of the battery cells 14 within the battery pack system 10. It should be noted that for the battery pack system 10 to develop a short, the battery cell parts need to move relative to each other and come in contact with one another. The frangible conductor 12 will break during this relative motion so that if there is contact between the batteries 14, the battery cells 14 will already be disconnected from one another and there will be no short circuit therefrom.

Under normal operating conditions of the electric vehicle the high voltage is created by the battery cells 14 are isolated from the occupants and emergency responders. In many failure modes the safety systems of the electric vehicle operating system further isolate the high voltages but in the most severe collisions, the high voltages may become accessible. Therefore, the frangible conductors 12 will help reduce the potential of electrocution and any electrical danger by disconnecting the battery cells 14 from the electrical vehicle car system and improve the abuse tolerance of the battery pack system 10. Hence, with the frangible conductors 12 made of, in one contemplated embodiment, aluminum wires from very specific alloys that are ultrasonically bonded to the battery cells 14 and to a collector plate 16 the ability to design and adjust the size, length, diameter, and specific materials added to the alloys of the frangible conductors 12 will allow for a variety of breaking points for the frangible conductor 12 tuned to specific mechanical forces encountered in electric vehicles such that a small five mile per hour bumper collision will not break the frangible conductors 12, however, higher force collisions, both front, rear and side and/or rollovers of an electric vehicle will allow for breaking and disconnecting of the battery cells 14 from the collector plate 16 and hence, the removal of short circuits and possible electrocution by first responders. However, the conductors 12 as designed will still provide adequate current carrying capability and mechanical strength during normal operations of the electrical vehicle.

Therefore, the present invention will allow for the mechanical, thermal and electrical behavior of the frangible conductor 12, in this case in the form of a wire, to be calibrated to predetermined values of any known electrical values, mechanical values and thermal values based on the design requirements and the environment in which the electrical vehicle or equipment will be used. Therefore, if mechanical, electrical and thermal scenarios beyond the designed operating conditions of the battery pack system 10 are encountered the conductors 12 will disconnect by some type of mechanical or thermal means. These thermal means may include but are not limited to an over current, runaway combustion products, runaway heating, electrical arcing, reversal of battery cell voltage and high impedance connections. Examples of such mechanical means or occurrences through which the frangible conductors 12 may disconnect may include but are not limited to cyclic loading and fatigue, ultimate tensile strength and bonding failure in the interface between the battery cells 14 and the collector plates 16. Hence, the tunable frangible battery pack system 10 is capable of being designed for any known electric vehicle application and will provide piece of mind and safety to first responders responding to accidents involving electric vehicles that have high voltage battery packs from fear of electrocution and other injuries during rescue of occupants within the electric vehicles during such situations.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A battery pack system, said battery pack system comprising:
   a plurality of battery cells;
   a battery pack housing comprised of a first housing member and a second housing member piece complementary to said first housing member, wherein an internal region defined by a first housing member internal surface and a second housing member internal surface is configured to hold said plurality of battery cells, wherein said first housing member internal surface further comprises a first plurality of counterbores configured to hold a first end portion of said plurality of battery cells, wherein said first housing member internal surface further comprises a first plurality of orifices corresponding to said first plurality of counterbores and coupling said first housing member internal surface to a first housing member external surface, wherein said second housing member internal surface further comprises a second plurality of counterbores configured to hold a second end portion of said plurality of battery cells, wherein said second housing member internal surface further comprises a second plurality of orifices corresponding to said second plurality of counterbores and coupling said second housing member internal surface to a second housing member external surface;
   at least one first housing member collector plate arranged on said first housing member external surface, wherein said at least one first housing member collector plate further comprises a third plurality of orifices aligned with said first plurality of orifices, wherein said at least one first housing member collector plate is electrically conductive;
   at least one second housing member collector plate arranged on said second housing member external surface, wherein said at least one second housing member collector plate further comprises a fourth plurality of orifices aligned with said second plurality of orifices, wherein said at least one second housing member collector plate is electrically conductive;

a first plurality of frangible conductors electrically connecting said at least one first housing member collector plate and each of said plurality of battery cells, wherein said first plurality of frangible conductors are electrically connected to each of said plurality of battery cells via a first terminal corresponding to each first end portion of said plurality of battery cells; and a second plurality of frangible conductors electrically connecting said at least one second housing member collector plate and each of said plurality of battery cells, wherein said second plurality of frangible conductors are electrically connected to each of said plurality of battery cells via a second terminal corresponding to each second end portion of said plurality of battery cells.

2. The battery pack system of claim 1 wherein said first and second housing members are made of a plastic material.

3. The battery pack system of claim 1 wherein said at least one first housing member collector plate and said at least one second housing member collector plate are comprised of a material selected from the group consisting of nickel plated aluminum and copper.

4. The battery pack system of claim 1 wherein said first and second pluralities of frangible conductors are configured to break when the battery pack is exposed to a predetermined force or heat.

5. The battery pack system of claim 1 wherein said first and second pluralities of frangible conductors are comprised of an aluminum alloy.

6. The battery pack system of claim 5 wherein said aluminum alloy has a predetermined percentage, by weight, of magnesium and nickel.

7. The battery pack system of claim 6 wherein said magnesium is approximately 0.5% by weight of said aluminum alloy and said nickel constitutes approximately 50 parts per million of said aluminum alloy.

8. The battery pack system of claim 1 wherein said first plurality of frangible conductors are bonded to each of said plurality of battery cells and said at least one first housing member collector plate, and wherein said second plurality of frangible conductors are bonded to each of said plurality of battery cells and said at least one second housing member collector plate.

9. The battery pack system of claim 1 wherein said first plurality of frangible conductors are ultrasonically bonded to each of said plurality of battery cells and said at least one first housing member collector plate, and wherein said second plurality of frangible conductors are ultrasonically bonded to each of said plurality of battery cells and said at least one second housing member collector plate.

10. The battery pack system of claim 1 wherein said first and second pluralities of frangible conductors have a circular cross section or ribbon like shape.

11. The battery pack system of claim 1 further comprising a silicone dielectric gel arranged around said plurality of battery cells.

12. The battery pack system of claim 1 wherein said at least one first housing member collector plate is secured to said first housing member external surface by heat staking or epoxy, wherein said at least one second housing member collector plate is secured to said second housing member external surface by heat staking or epoxy, said at least one first housing member collector plate further comprising a first plurality of recessed areas adjacent to said third plurality of orifices in said at least one first housing member collector plate, said first plurality of frangible conductors electrically connected to said first plurality of recessed areas, said at least one second housing member collector plate further comprising a second plurality of recessed areas adjacent to said fourth plurality of orifices in said at least one second housing member collector plate, said second plurality of frangible conductors electrically connected to said second plurality of recessed areas.

* * * * *